Sept. 12, 1933.  T. M. MEARS  1,926,548
METHOD OF AND APPARATUS FOR MAKING DIE STAMPED PIES
Filed Jan. 18, 1932  5 Sheets-Sheet 2
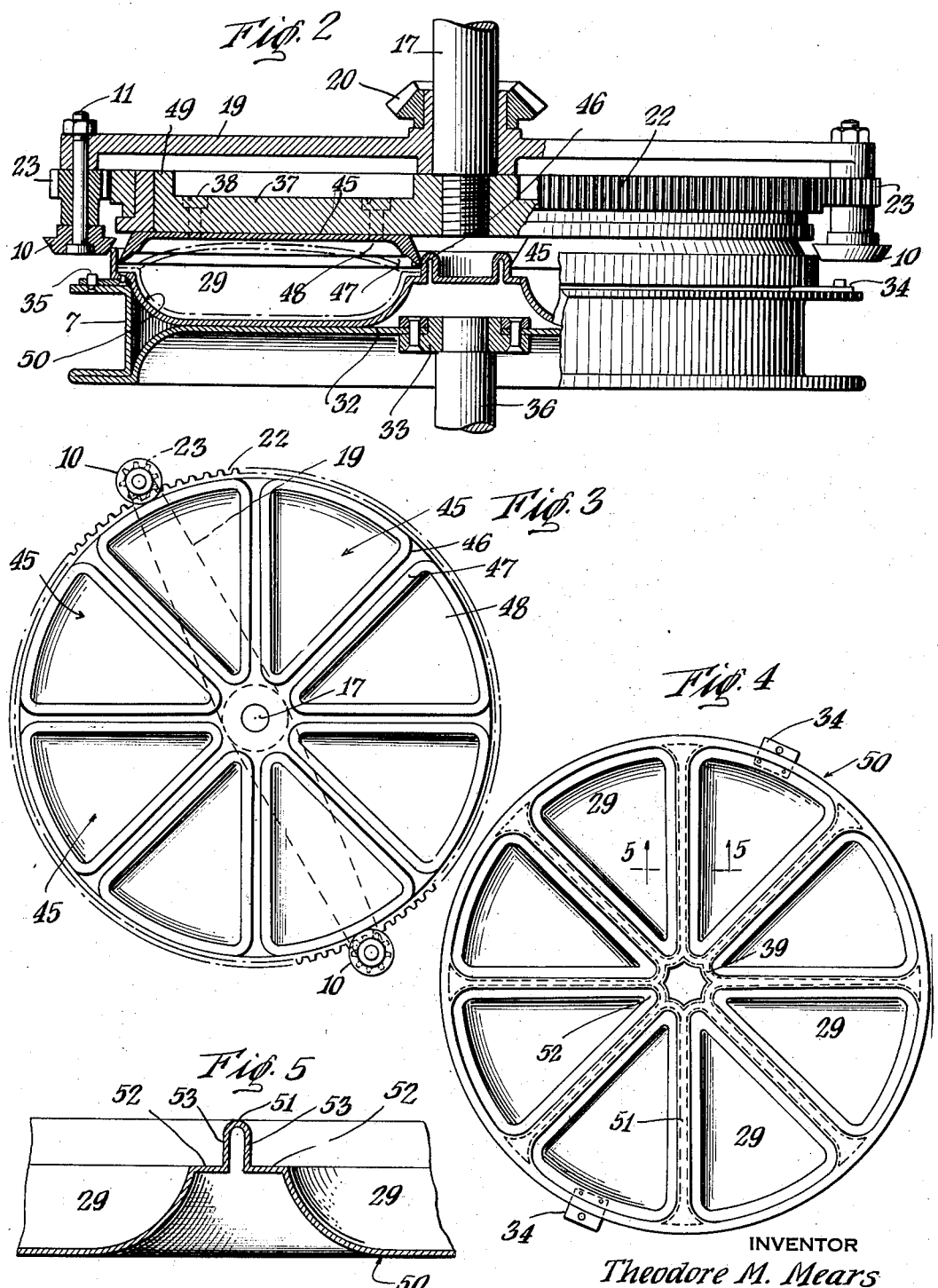
INVENTOR
Theodore M. Mears
BY
Charles A. Morton
ATTORNEY Sept. 12, 1933.  T. M. MEARS  1,926,548
METHOD OF AND APPARATUS FOR MAKING DIE STAMPED PIES
Filed Jan. 18, 1932  5 Sheets-Sheet 3
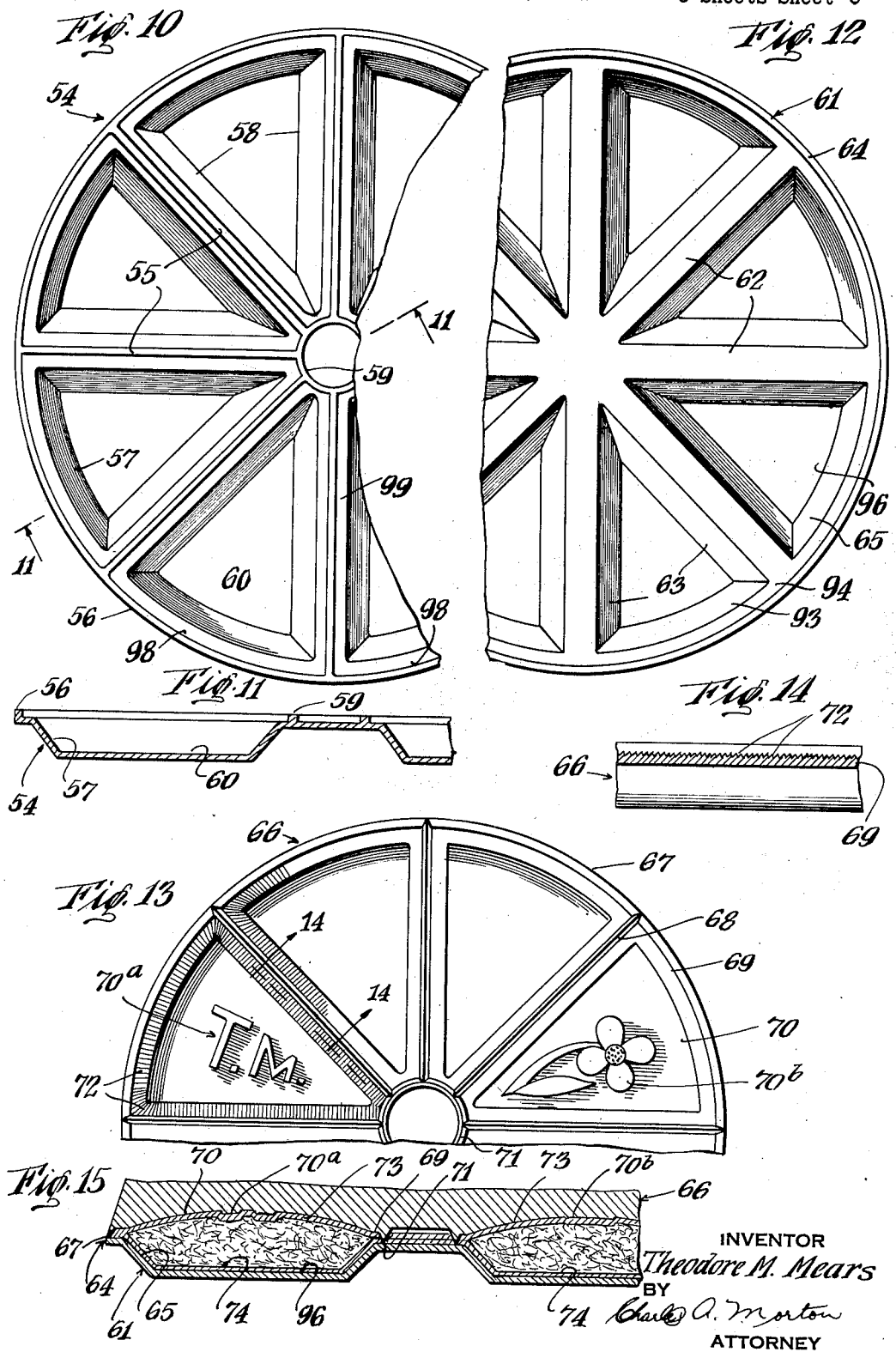
INVENTOR
Theodore M. Mears
BY
Charles A. Morton
ATTORNEY Sept. 12, 1933.  T. M. MEARS  1,926,548
METHOD OF AND APPARATUS FOR MAKING DIE STAMPED PIES
Filed Jan. 18, 1932  5 Sheets-Sheet 4
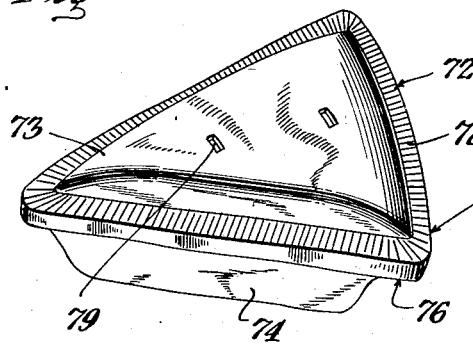
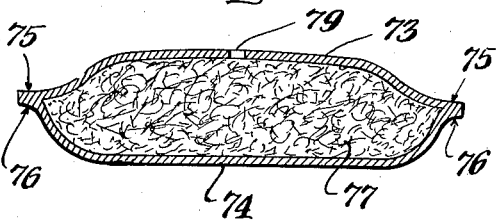
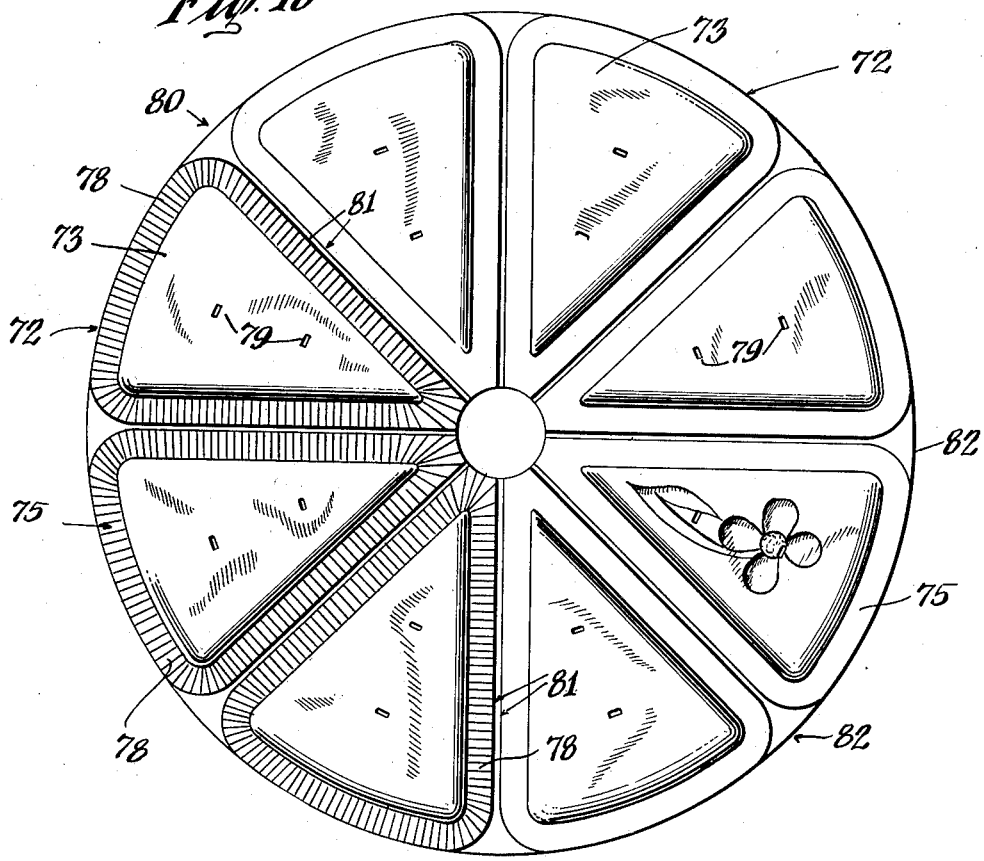
INVENTOR
Theodore M. Mears
BY
Charles A. Morton
ATTORNEY Sept. 12, 1933.   T. M. MEARS   1,926,548
METHOD OF AND APPARATUS FOR MAKING DIE STAMPED PIES
Filed Jan. 18, 1932   5 Sheets-Sheet 5
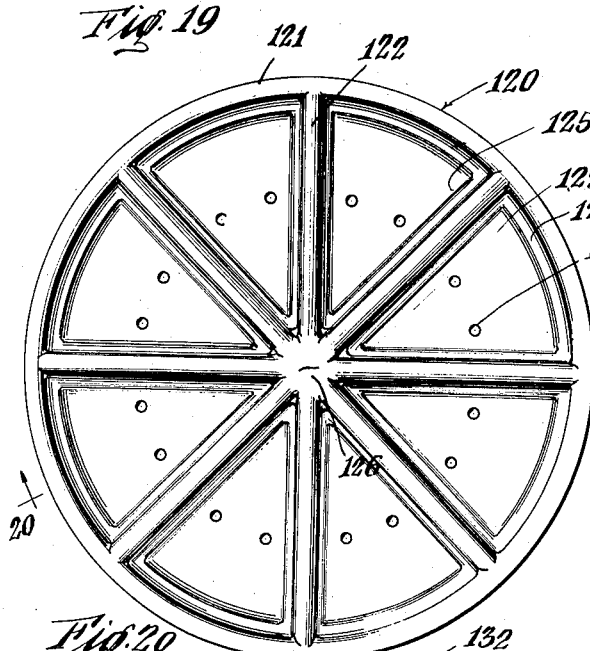
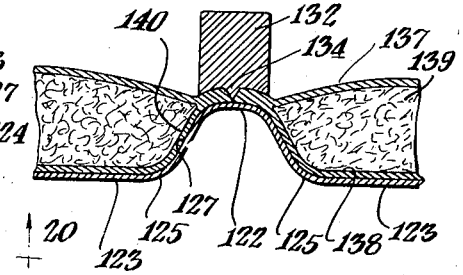
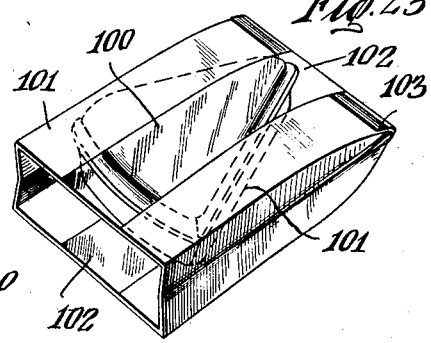
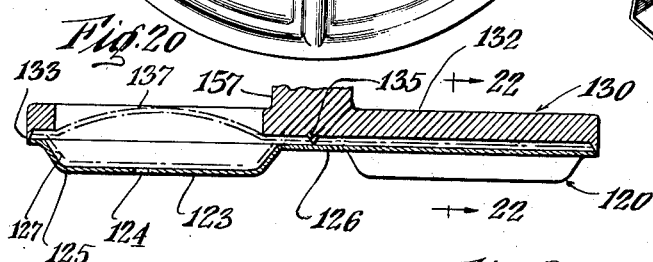
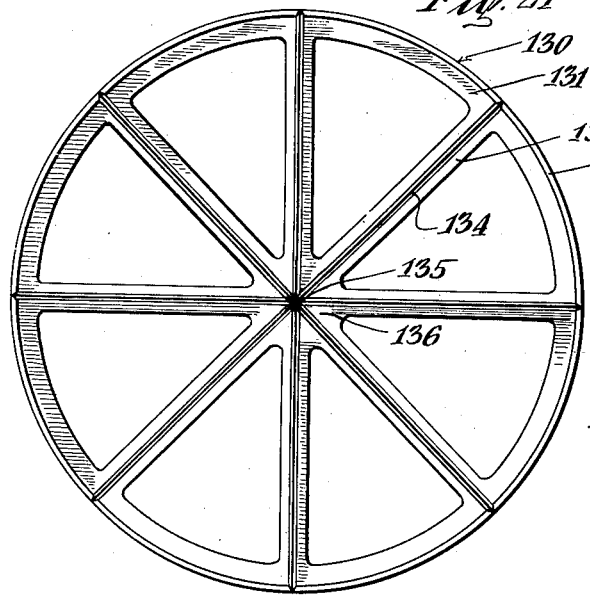
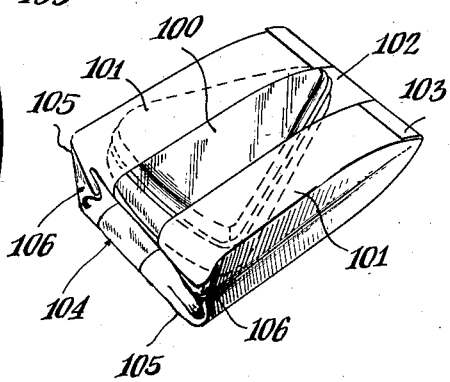
INVENTOR
Theodore M. Mears
BY
Charles A. Morton
ATTORNEY Patented Sept. 12, 1933

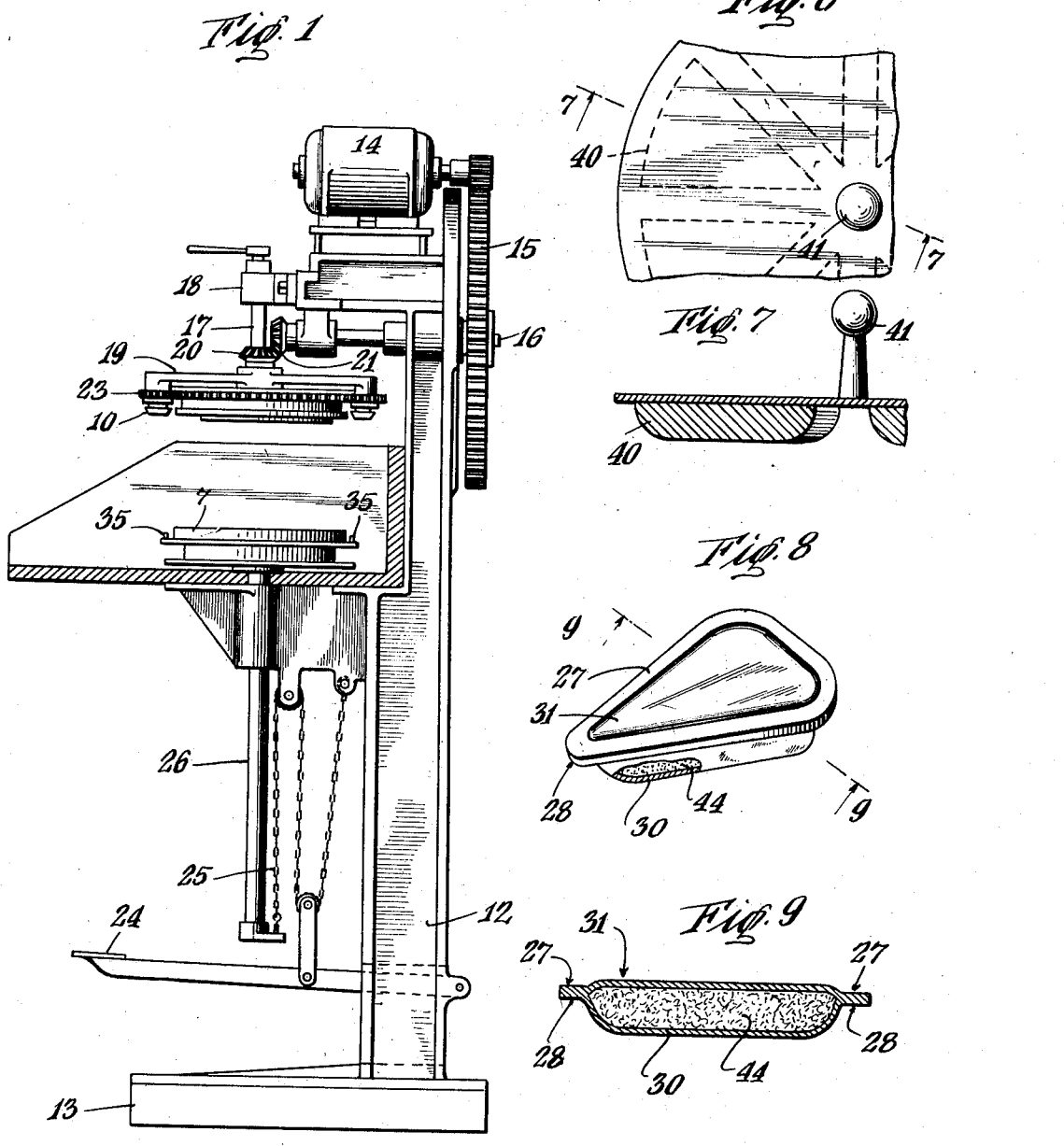

1,926,548

UNITED STATES PATENT OFFICE 1,926,548

METHOD OF AND APPARATUS FOR MAKING DIE STAMPED PIES

Theodore M. Mears, Brooklyn, N. Y., assignor to The Tri-Pie Corporation, Brooklyn, N. Y., a corporation of Delaware Application January 18, 1932. Serial No. 587,237

6 Claims. (Cl. 107—1)

This invention relates to an improved method of, and apparatus for, making die stamped pies. This application is a continuation in part of my former applications Serial Nos. 523,254 and 523,255 filed March 17, 1931, now U. S. Patents 1,841,494 and 1,841,495 respectively, patented January 19, 1932, and of my copending application Serial No. 573,654 filed November 7, 1931.

It has heretofore been standard practice to bake pies in circular pie plates, the product being a circular pie approximately ten inches in diameter, which is thereafter cut into a plurality of pie sectors varying from six to eight in number constituting a portion of pie of a size sufficient to satisfy the appetite of the average diner. After some of the portions of pie have been removed from the pie plate the exposed cut edges of the remaining portions tend to cause the pie to become dry and stale besides exposing the sweetmeat contained therein to flies and other insects, so that by the time the final portion is ready to be sold it is frequently so altered in appearance that the customer would not accept it and it becomes necessary to treat it as waste matter. It will be obvious that the portions thus wasted reduce the profits upon the remainder pro rata. Again an individual pie portion made according to the standard practice heretofore described must be handled with care as it will break quite readily, such individual pie portions therefore are not very satisfactory when used in basket lunches and the like. In view of all these difficulties it seems surprising that individual pies having the appearance and dimensions of the standard sector of pie have not been adopted for general use but the cost of production of such pies if made by hand as opposed to the cost of hand cut sectors of large machine made round pies makes the proposition an expensive and therefore an uneconomic one.

One object of this invention is an individual pie conforming in size, shape, and general appearance to the individual pie portion of the former standard practice, which can be sold in competition therewith.

Another object is to keep the individual pie portion fresh and edible for a much longer period of time.

Another object is to improve the hygienic standard of the individual pie portion.

Another object is to reduce the risk of breakage in handling thus increasing the commercial possibilities thereof.

Another object is an inexpensive process for making such individual pies in order to permit competition with the individual pie portions used in standard practice in the prior art.

Another object is an improved machine for carrying out the improved process.

Another object is an improved form of multiple-unit pie plate, constituting a portion of the die mechanism of said machine.

In accordance with this invention individual pies conforming in size, shape and general appearance to the pie portions of the former standard practice are made by a die stamping process, the product being a pie having the sweetmeat therein completely housed within a sector or triangular shaped shell of dough, the pie being thereafter baked in the usual manner.

In the drawings comprising five sheets of twenty-four figures numbered Figs. 1 to 24 inclusive;

Fig. 1 is a side view of one form of machine which may be employed in the process of making individual die stamped sector shaped pies.

Fig. 2 is an enlarged side view of the male and female die mechanism of Fig. 1 (partly in section and showing some of the parts partially broken away) employed in carrying out certain steps of the process.

Fig. 3 is a plan view of the working face of one form of upper (male) die looking upward from below the upper die of Fig. 2.

Fig. 4 is a plan view of the pie pan constituting the lower or female die member of Fig. 2, looking downward from above the pie pan of the latter figure.

Fig. 5 is a detailed sectional view of the flanges of the female die taken along lines 5—5 of Fig. 4, looking in the direction of the arrows.

Fig. 6 is a plan view of a dough lining matrix, said matrix being broken away.

Fig. 7 is a vertical sectional view of the matrix of Fig. 6, taken along the line 7—7 of Fig. 6 looking in the direction of the arrows.

Fig. 8 is a perspective view of one form of individual sector shaped pie produced in accordance with the process hereinafter described, and showing the side wall partially broken away.

Fig. 9 is a vertical cross section of the pie taken along the line 9—9 of Fig. 8 looking in the direction of the arrows.

Fig. 10 is a plan view of another form of pie pan, female die, or mold partially broken away.

Fig. 11 is a vertical section thereof taken along line 11—11 of Fig. 10 looking in the direction of the arrows.

Fig. 12 is a plan view of another form of pie pan or female die, partially broken away.

Fig. 13 is a plan view of the working face of an upper (male) die partially broken away, intended to be used, for example, with the female dies of Figs. 10 and 12.

Fig. 14 is a fragmentary section of the same taken along the line 14—14 of Fig. 13, looking in the direction of the arrows.

Fig. 15 is a central vertical section (partially broken away) of the pie pan of Fig. 12 used as a female die with the male die of Fig. 13, assembled to carry out the pie finishing operation.

Fig. 16 is a perspective view of another form of the ultimate product, a baked sector or triangular shaped pie.

Fig. 17 is a vertical section thereof.

Fig. 18 is a plan view of a multiple-unit of said pies showing a modified form.

Fig. 19 is a plan view of still another form of multiple-unit pie pan or female die.

Fig. 20 is a vertical section of the plate of Fig. 19, in combination with the male die of Fig. 21, taken along line 20—20 of Fig. 19, looking in the direction of the arrows.

Fig. 21 is a plan view of the working face of the upper male die of Fig. 20, adapted to be used with the pie plates of Figs. 10, 12 or 19.

Fig. 22 is a vertical sectional view of the cutting and compressing mechanism of the die of Fig. 20, taken along the line 22—22 of Fig. 20, looking in the direction of the arrows.

Fig. 23 is a perspective view of one form of sanitary commercial package wherein said pie may be distributed.

Fig. 24 is another view of the said package closed and ready for shipment.

Like reference characters designate corresponding parts throughout the several figures of the drawings.

The mechanism consists essentially of a pie pan, sub-divided into a plurality of triangular or sector shaped receptacles, of the general type disclosed in Figs. 4, 10, 12 and 19, constituting a female die, and a complementary male die (Figs. 3, 13 or 21) adapted to co-operate with the female die in the process of forming the pies (Figs. 8, 16 and 18).

Referring to Figs. 2, 3, 4 and 5, the pie pan or mold 50 is sub-divided into a plurality of sector shaped recesses 29 arranged to define a regular (as disclosed—circular) figure. Each shallow recess 29 is sector shaped in plan, and is provided with side or partition walls and a back wall. The upper edge of each wall is continued in the form of a laterally outwardly projecting flange 52 united at 51. The vertical flanges 53 may be omitted, (see Figs. 12 and 19) but if used adjacent vertical flanges 53 constitute a series of radially extending reinforcing ribs for the pan 50. The upper (male) die 45 (Fig. 3) may consist of a series of sector shaped hollow blocks 48, having their peripheral walls sharpened as by bevelling at 46 to constitute, means for cutting or separating the upper and lower layers of dough (30—31, Fig. 6, or 73—74, Fig. 17), along the inner faces of the flanges 53 of plate 50, and means for compressing the flanges 27—28 (Fig. 9) or 75—76 (Fig. 17) of the layers of dough together, to crimp and securely unite them on the laterally projecting flanges 52 of plate 50. The blocks 48 may be internally hollowed out so as not to compress or mar the heaped up crown portion 73 of the pie (Fig. 17) shown in dotted lines in Fig. 2 (see also Fig. 20).

The pie pan 50 may be supported in a holder 7 (Figs. 1 and 2), in which it may be placed in proper position to correctly register with the male die 45, by any suitable device, as by its punched ears 34, adapted to register with studs 35 of the holder 7. When thus assembled the pan 50 becomes in effect one of a series of interchangeable female dies. The bottom of pan 50 is supported by the underside 32 of holder 7. Holder 7 may be mounted on shaft 26 (Fig. 1) in any preferred manner, as for example by a central collar 33, secured to the shaft 36, forming the upper end of shaft 26 (compare Figs. 1 and 2). The male die 45 may be secured to a foundation 37, by bolts 38, said foundation being in turn secured to shaft 17, on which arm 19 may if desired be rotatably mounted to revolve about the circumference of the male die. Bevelled gears 20 and 21, are used to rotate arm 19 carrying the cutters 10—10, which are likewise rotatably mounted on the spindles 11—11, being rotated by the action of gear wheels 23—23 intermeshing with the circular rack 22. If cutters 10—10 are omitted, bevelled gears 20 and 21, rack 22 and arm 19 are omitted.

Referring now to the die press of Fig. 1, the shaft 17 is mounted on extension bracket 18 of framework 12. Any suitable source of power supply such as electric motor 14, mounted above bracket 18, may be used to drive bevelled gears 20—21 by way of the shaft 16, driven by gear wheel 15 which is in turn geared to motor 14. The press is supported on a base 13, and is provided with a table carried by a bracket through which shaft 26, slidably supporting the holder 7, is adapted to be raised and lowered under control of the chain 25, which passes over suitable pulleys and is actuated by foot operated lever 24. If cutters 10—10 are omitted motor 14, gear wheel 15 and shaft 16 may be omitted also.

The plate 54 (Fig. 10) may be used instead of plate 50. This plate may be quite shallow and has a plurality of sector shaped receptacles, each receptacle having a flat bottom wall 60, and bevelled partition walls 58 and end walls 57. A series of beads 55 disposed along the medial line of the horizontal flanges 99, which surround the top of the various receptacles and serve to interconnect the side walls 58, meet and merge at the center as at 59, and at their outer ends, beads 55 merge with the encircling bead 56, surrounding the peripheral flange 98 (Fig. 10). A suitable complementary male die may be used in conjunction with pie pan 54. The male die 66 (Fig. 13), will register with the female die 54, although other modified forms of the complementary male dies 66 and 45 could be utilized (see for example die 130 Fig. 21), without departing from the spirit of this invention.

A smooth topped plate 61, Fig. 12, or 120 (Fig. 19) may likewise be substituted for plate 50, and die 66 or die 130 for die 45. The plate may be made shallow in which event it is approximately one half the depth of the ultimate pie as indicated by flanges 75—76 (Fig. 17). In the form disclosed in Fig. 12, the plate has a series of sector shaped receptacles with flat bottom walls 96, and bevelled side walls 63 and back walls 65. The horizontal flanges 62 interconnecting the partitioning side walls 63 are smooth, and constitute seats for the cutters 67, 68, and 71, of male die 66 (Figs. 13 and 15). The peripheral edge of plate 61 may be bevelled as at 64, to eliminate any sharp edge from the plate wall. The compressing members of die 66 may be serrated or scored as at 72 (Figs. 13 and 14) to give a roughened crimped appearance to the pie crust. Fig. 15, indicates in section the ultimate position of the upper and lower layers of dough for containing the sweetmeat after the pie has been molded and stamped and before the baking operation. It will be observed that the flanges of the upper and lower layers of dough are compressed and united in the channel formed between the oppositely disposed flanges 62 and 69 of female die 61 and male die 66, which is further bounded by cutter 67 of the male die, while the cutters 67, 68 and 71 function to separate the upper and lower layers of dough to complete the formation of the individual sector shaped or triangular pies. Each pie will have the cubical contents of the conventional individual sector shaped portion of pie customarily served in restaurants. If the upper die is scored or serrated as at 72, the peripheral marginal edge of the product will appear substantially as indicated in Fig. 16. Other forms of scoring patterns may be used if preferred or may be omitted as fashion and taste dictate in the particular locality served.

In the embodiment shown in Figs. 13 and 15, the male die 66 and the pan or female die 61, are arranged to so co-act as to constitute a closed multiple-unit mold for molding the upper and lower layers of dough and imparting to them their ultimate configuration. The sweetmeat is preferably heaped up in each sector shaped receptacle of pan 64 so that as the upper and lower walls 70 and 96 of die 66 and pan 61 are brought into co-operative registry, the upper layer of dough 73 and the sweetmeat will be forced to assume the configuration of the wall 70 of die 66. Each sector shaped roof-like wall 70 of male die 66 may be provided with the trademark of the baker as indicated by the arbitrary symbol T. M. (70a) or the flower design (70b). The trademark may project from or be recessed in the wall 70, dependent upon whether the trademark is to be embossed or debossed in the upper layer of dough 73. In either case after baking the trademark of the baker will be clearly delineated in the crown of each sector shaped pie as indicated at 70a or 70b Fig. 15.

The matrix (Figs. 6 and 7) is a die member having a series of projections 40 equal in number, configuration and arrangement, to the number, configuration and arrangement of the plate 50, 54, 61 or 120 as selected. The projections 40 are adapted to register within the receptacles of the selected form of plate, but are smaller than the receptacles by an amount equal to the ultimate thickness of a layer of dough, thereby acting to gauge and standardize the thickness of the foundation layer 30 (Fig. 9) or 74 (Fig. 17), of pie crust.

Fig. 19 illustrates another form of pie plate 120 having a plurality of receptacles each provided with a sector shaped bottom wall 123, radial side walls 125 and a back wall 127. Each bottom wall is perforated as at 124 to furnish air vents to permit the escape of the air from the sector shaped receptacles as the lower layer of dough 138 (Fig. 22) is lined against the walls of the multiple-unit plate by the operation of the matrix of Fig. 6. The radial flanges 122 and the circumferential flange 121 of the plate 120 are slightly curved (see Fig. 22) and the angles formed by the intersection of the radial walls 125 at 126 and the merger of said radial walls 125 with the rear wall 127 are slightly rounded so as to eliminate all sharp corners from the pie plate (compare the receptacles of Fig. 19 with those of Figs. 10, and 12). As a result of this arrangement the tendency of the dough to adhere in the sharp corners formed by the walls of the receptacles after the pie is baked is entirely eliminated, and the baked pie may be removed from the pie pan when the same is overturned, without damaging the bottom crust 138 (Fig. 22) of the pie.

The male die 66 (Fig. 13) may be used in conjunction with the plate 120 (Fig. 19) if desired, or the male die 130 (Fig. 21) may be used if preferred, dependent upon the wishes of the baker. If male die 130 is used, it will be observed that the sweetmeat may be heaped up as best indicated by the position of the upper layer of dough 137 in Fig. 20, which figure is a vertical sectional view of male die 130 brought into co-operative registry with plate 120. The male die 130 consists essentially of a series of radially disposed compressing members 132 joined together at the center 136 merging at the outer extremities with the peripheral compressing member 131 to define a regular figure conforming in size and shape to the size and shape of the pie pan 120. It should be understood that while for purposes of illustration the pan 120 as well as the pans 50 (Fig. 4), 54 (Fig. 10), and 61 (Fig. 12), are shown in circular form with complementary male dies of circular shape adapted to register therewith, the said plates may be of any preferred shape or size so long as the sector shaped receptacles therein contained are substantially equal in area to the area of the conventional sector shaped individual pie portion, and the male die will of course be modified in shape to conform to the desired shape of the pie pan.

The compressing members 132 (Fig. 21) are provided with a series of cutters 134 merging together at 135. A peripheral cutter 133 overlying the peripheral compressing member 131 and merging with the cutters 134 may likewise be provided, although this cutter may be omitted if the bevelled cutters 10—10 (Fig. 2) are used, as it is not essential to use both types of means for trimming the waste dough surrounding the peripheral edge of the pie plate. In referring to Fig. 22 it will be observed that the cutter 134 operates to sub-divide the upper and lower layers of dough along the flange 122 of the pie plate 120. The cutter likewise serves to limit the movement of the plate 120 toward the male die 130 so as to maintain the compressing members 132 in spaced relation relative to the flanges 122 of the plate. In this manner, the flanges and compressing members co-act to compress and crimp the strips of dough overlying the flanges 121 and 122 of the plate, while the cutters 133 and 134 trim the waste dough and sub-divide the multiple-unit pie along the medial lines of the radial flanges 122 to produce a plurality of sector shaped pies each having the cubical contents of the conventional individual pie portion and completely enclosed within its own shell of dough. That portion of the dough of each sector shaped pie which overlies the flanges, is crimped and securely united to define a peripheral, marginal, sealed flange, wherein the component upper and lower layers of dough are completely merged together and lose their separate identity.

In carrying out the process of making individual sector shaped die stamped pies, a sheet of dough 30 (Fig. 9) is first placed so as to completely cover the plate (50, 54, 61 or 120) and is evenly and uniformly lined against the face of the plate by inserting the matrix (Fig. 6) in the receptacles of the plate, the dough 30 being slightly stretched to conform to the configuration of the pie plate. The lower dotted line (Figs. 2 and 20) indicate the shape assumed by the lower layer of dough 30 (or 127) in each of the receptacles of the plate. After the matrix (Fig. 6) has been employed the lining of dough not only completely and snugly lines the pie plate, but extends over the peripheral wall of the plate to provide a trimming edge for removal by the cutter 47 (Fig. 3), 67 (Fig. 13), or 133 (Fig. 21), as the case may be, and/or cutters 10 (Fig. 2), as hereinafter described. Each receptacle is now filled with any preferred sweetmeat 44 (Fig. 9), or 77 (Fig. 17), and if desired different receptacles of the same multiple-unit pie may be filled with different sweetmeats dependent upon the needs of the particular restaurant or customer for which the pies are being made. The receptacles are either filled or heaped to overflowing with the sweetmeat, and the top sheet of dough 31 (Fig. 9), or 73 (Fig. 17) is then placed over the sweetmeat filled receptacles to completely cover the receptacles 29 (Fig. 4), or corresponding receptacles (Figs. 10, 12 or 19), so as to leave a margin of dough overhanging the peripheral wall of the pie plate. The dough overlying the flanges of the pie plate is preferably moistened with the fruit syrup contained in the sweetmeat to more perfectly and securely merge and unit the separate flanges 27 and 28 (75 and 76) into a single crust. Up to this point the steps employed have conformed (except for the use of matrix 40 and the fruit syrup) substantially to those followed in making one large pie, and the time required to carry out this series of steps would not differ therefrom to any appreciable extent. It should be observed however, that the pie so formed is still merely one large pie having a plurality of separate cells filled with sweetmeat. It is therefore necessary to finish off the complete pie and to divide it into a plurality of individual pies each a unit by and in itself, and to impart to each of said individual units, its ultimate appearance, size and shape, preparatory to baking the same. This brings us to the die stamping and waste trimming stage which can be better understood by considering the apparatus of Figs. 1, 2 and/or 15 or 20.

The operation is as follows:—A freshly made unbaked pie in its associated multiple unit pan or mold is placed in holder 7 so that the registering means (for example 34 and 35) interlock. Foot operated lever 24 is depressed to cause the chain 25 to force plunger 26, supporting holder 7, vertically upwards, whereby the pie is compressed between the flanged walls of the male and female dies, and the cutters 46 (Fig. 3); 67, 68, 71 (Fig. 13); or 133, 134 (Fig. 21) press the raw dough against the seats defined by the flanges 52 (Fig. 4); 62 (Fig. 12); or 131, 132 (Fig. 21); as the case may be, to sever the upper and lower layers of dough vertically, thus separating the multiple-unit pie into a plurality of individual pies, equal in number to the number of spaced receptacles in the pie plate. The surplus dough surrounding the external (peripheral) wall of the female die is separated and removed by the peripheral cutters (see for example 67 of Fig. 13 and 133 of Fig. 21) and/or rotating cutters 10 (Figs. 1 and 2), which are bevelled to give a rolling motion to the sheared edges of the dough.

Compressing the flanges 27—28 (Fig. 9), or 75—76 (Fig. 17) between the circumferential peripheral) and partitioning walls of the male and female dies, securely unites the flanges of dough along their oppositely disposed contacting margins. The flanges of dough are evenly and uniformly compressed over the entire width and length of the flanged walls of the pie plate and throughout the entire periphery of each pie. Mechanically compressing the syrup moistened upper and lower layers of dough together in the operation of sub-dividing the large pie causes the upper and lower layers of dough to be uniformly united at 27—28 (Fig. 9), or 75—76 (Fig. 17) to form a much improved joint which will not separate or crack during or after baking, and the permanence of the joint so formed is a great advantage in small pies of the type described which are apt to be frequently and roughly handled during distribution, so that any weakness in the joint would result in the separation of the upper and lower layers of the pie crust.

In this manner the large pie is divided into a plurality of individual sector shaped pies of uniform size, shape and appearance, each of said pies being a modification of the conventional pie portion of the former standard practice in that the sweetmeat is entirely sealed within its own shell of dough. If the male die of the form shown in Figs. 2 or 21 is used, the convex crown (73, Fig. 17) of the pie will not be compressed in any way because these male dies are hollow or recessed, hence only the peripheral flanges 27 and 28 (75 and 76) need be subjected to compression between the dies. When it is desired to mold the crown of the pie, however, a male die of the type shown in Fig. 13 may be employed as previously described.

When the foot operated lever 24 is released, the interchangeable pie plate containing the multiple-unit pie is removed from holder 7, and the plate is inserted in the heated oven and the pie is baked. One or more vents 79 (Fig. 16) may be inserted in the crown 73 of the raw dough before baking is commenced. After being baked the individual pies may be removed from the pie pan by merely turning it upside down when the pies fall out by their own weight.

The individual pies 100 (Figs. 23 and 24) may now be inserted in suitable containers 101. Each container is provided with a window 102 of cellophane or the like. This window may be oblong or triangular to conform to the shape of the pie contained in the bag. One end of the bag is closed as at 103, and after the pie is placed therein the open end is turned under (Fig. 24) and the corners bent as at 105. Staples may be inserted in the corners of the bag to keep it from coming open. The bag may if preferred be sector shaped to conform to the shape of the pie. Other forms of sanitary envelopes or containers may be substituted if preferred. It will be observed that the pie as distributed is independent of any dish or pan and must therefore be strong enough to be self-supporting. The securely united flanges 75 and 76 (Fig. 17) materially strengthen the pie and tend to protect it from injury or damage.

In some cases the purchaser may prefer to have the pies shipped in multiple units 80 (Fig. 18), in which event the pie may be die stamped as before, except that the operation of the cutters may be so regulated and adjusted, that the interconnecting web of dough 82 may be only partially severed along the medial lines 81, so that the individual pies 72, may be readily separated without injury to those remaining. Only a very thin uncut film of dough need be left, in order to accomplish this result.

The multiple-unit pie 80 (Fig. 18) is shipped as a single unit and preferably without the pie plate in which it was baked, but it may be distributed in the pie plate if local conditions make this method of distribution necessary. Local conditions will depend to a large extent upon the customer's wishes, but wherever possible the pie will be removed from the plate before shipment or distribution. If local conditions make it desirable the multiple-unit pie 18 may be transferred from the plate to a suitable multiple-unit container having a base portion conforming in contour to that of the multiple-unit pie 80, and a suitable upper covering member for enclosing the pie may be placed upon the pie filled base portion and secured in place by staples or the like. This upper member may be provided with one or more window-like elements of cellophane through which the pie crowns will be visibly displayed. If the crown is branded with a trademark the appearance of the entire commercial package may be very attractive to the aesthetic taste.

There is a distinct advantage in making the pies in a shallow rather than a deep pie pan. When made in a deep pie pan the bottom and side walls of the pie are in contact with the corresponding walls of the pan, and after the baking operation is completed the pies have a tendency to adhere to the pan. This tends to damage the pies and create what are known in the trade as "seconds", that is articles which are sold at a reduced price (if the same are saleable at all). By reducing the percentage of pie surface contacting with the surface of the pan, the percentage risk of adhesion is correspondingly reduced. But if the pan is made shallow the cubical contents of the pie portion would likewise be reduced unless compensated for in some other way. This is accomplished by using a shallow pan each of the receptacles whereof has a cubical content substantially less than the cubical contents of the ultimate sector shaped individual pie, and heaping the sweetmeat above the plane of the horizontally extending flanges 52, 99, 62, 122 (Figs. 4, 10, 12 and 19 respectively). The upper layer of dough 73 (Fig. 17) is placed over the heaped up hills of sweetmeat 77, so that the uncooked multiple-unit pie presents the appearance of a plurality of convex sector shaped elements (compare Figs. 16, 17 and 20). The multiple-unit pie, positioned in the pie plate 50, 54, 61 or 120, is now brought into registry (Fig. 2 or 20) with the male die, but owing to the hollowed out configuration of the die (see 48 Figs. 2 and 3, also Fig. 21) the convex crown-like formation of the upper layer of crust is not disturbed. After the multiple-unit is baked it can be more readily disassociated from the mold, without risk of injury. A pie pan having receptacles approximately one half of the depth of the ultimate individual pie portion (measured from foundation 74 to crown 73 Fig. 17) gives good results.

Registry means other than ears 34 (Fig. 4) and studs 35 Figs. 1 and 2 may be employed. It will be observed that the plates of Figs. 10, 12 and 19 are not provided with ears 34. When any one of these forms of plate is employed a plurality of lugs projecting inwardly from the inner wall of the holder 7 and adapted to engage in the inverted V shaped channels formed in the underside of each of the said plates may be used, or a plurality of intersecting inverted V shaped cross members may be secured to the inner bottom of the holder 7 so as to register within intersecting channels formed in the underside of the plate.

The air vents 124 (Fig. 19) will cause the air to be driven out of the plate at the time the lower layer of dough is lined against the bottom of the plate by the matrix (Fig. 6). In this way imperfections in the lower layer of dough due to the existence of air bubbles or air pockets between the plate and the lower layer of dough are eliminated.

It should be understood that the plates shown in Figs. 4 and 10 are deeper than those shown in Figs. 12 and 19, although any one of the plates may be made deep or shallow as desired. Ordinarily if the pie is to have a "low" crown a "deep" plate will be used, while if the pie is to have a "high" crown a shallow plate will be employed.

It should also be understood that the male dies Figs. 3, 13 and 21 are interchangeable relative to the head of the die press (Figs. 1 and 2) and that any one of said male dies can be employed in the machine, as for example by means of an internally threaded collar adapted for attachment to threaded shaft 17.

What is claimed is:

1. The method of making individual sector shaped pies having the cubical contents of the conventional sector shaped pie portion which consists in placing one large common sheet of dough on a pie plate sub-divided by means of a series of partitioning walls and their interconnecting flanges into a plurality of flange topped receptacles each walled receptacle being sector shaped in plan but of less cubical contents than the cubical contents of a conventional sector shaped individual pie portion, lining the dough against the entire surface of said plate, filling the lined receptacles with sweetmeat until the sweetmeat is heaped above the plane of the tops of the partitioning walls, moistening the dough overlying the flanges with fruit syrup, placing one large common sheet of dough on top of the sweetmeat filled receptacles to completely cover the heaped up sweetmeat and the pie plate, compressing and securely uniting said common sheets of dough horizontally along the interconnecting flanges without compressing the crown of the pie, separating said common sheets of dough without appreciable wastage along the medial lines of the flanges interconnecting the partition walls, removing the waste dough overlying the peripheral wall of the plate to form a plurality of individual sealed sector shaped pies, and baking the pies on the plate.

2. The method of making individual sector shaped pies having the cubical contents of the conventional sector shaped pie portion which consists in placing one large common sheet of dough on a pie plate sub-divided by means of a series of partitioning walls and their interconnecting flanges into a plurality of sector shaped flange topped receptacles, lining the dough uniformly against the entire surface of said plate, filling the lined receptacles with sweetmeat, moistening the dough overlying the flanges with fruit syrup, placing one large common sheet of dough on top of the sweetmeat filled receptacles to completely cover the pie plate, compressing and securely uniting said common sheets of dough horizontally along the interconnecting flanges, separating said common sheets of dough without appreciable wastage along the medial lines of the flanges interconnecting the partition walls, removing the waste dough overlying the peripheral wall of the plate, and baking the pies on the plate.

3. The method of making individual sector shaped pies having the cubical contents of the conventional sector shaped pie portion which consists in placing one large common sheet of dough in a pie plate sub-divided by means of a series of partitioning walls and their interconnecting flanges into a plurality of sector shaped flange topped receptacles, lining the dough uniformly against the entire surface of said plate, filling the lined receptacles with sweetmeat, moistening the dough overlying the flanges with the fruit syrup of the sweetmeat, placing one large common sheet of dough on top of the sweetmeat filled receptacles to completely cover the pie plate, compressing and securely uniting said common sheets of dough horizontally along the interconnecting flanges, partially severing said common sheets of dough without appreciable wastage along the medial lines of the flanges interconnecting the partition walls, removing the waste dough overlying the peripheral wall of the plate, baking the pie on the plate, and removing the baked pie from said plate as a unit prior to distribution.

4. In a pie finishing machine and in combination, a mold subdivided into a plurality of spaced receptacles, each receptacle being sector shaped in form, substantially equal in area to the conventional sector shaped individual pie portion, and having a vented bottom wall, side walls constituting permanent partition walls between adjacent receptacles, and a back wall, flanges projecting laterally outwards from the partition and back walls, said flanges merging together to constitute a smooth continuous seat, all points of merger between adjacent side walls, side and back walls, and walls and flanges being rounded, to define a cornerless mold forming one of a series of interchangeable pie plates, and means co-acting with said seat to compress the dough overlying said seat in the operation of uniting the component layers thereof together and for trimming the waste dough.

5. In a pie finishing machine and in combination, a mold subdivided into a plurality of spaced receptacles, each receptacle being sector shaped in form, substantially equal in area to the conventional sector shaped individual pie portion, and having a vented bottom wall, side walls constituting permanent partition walls between adjacent receptacles, and a back wall, flanges projecting laterally outwards from the partition and back walls, said flanges merging together to constitute a smooth continuous seat, all points of merger between adjacent side walls, side and back walls, and walls and flanges being rounded, to define a cornerless mold forming one of a series of interchangeable pie plates, means for molding the crown of a pie formed in said bottom mold, means co-acting with said flanges to compress the pie dough overlying said flanges in the operation of uniting the component layers thereof together, and means for trimming the waste dough.

6. The method of making individual sector shaped pies having the cubical contents of the conventional sector shaped pie portion which consists in placing one large common sheet of dough on a pie plate sub-divided by means of a series of partitioning walls and their interconnecting flanges into a plurality of flange-topped receptacles each walled receptacle being sector shaped in plan but of substantially less cubicle contents than the cubicle contents of a conventional sector shaped individual pie portion, lining the dough against the entire surface of said plate, filling the lined receptacle with sweetmeat until the sweetmeat is heaped above the plane of the tops of the partitioning walls, placing one large common sheet of dough on top of the sweetmeat filled receptacle to completely cover the heaped up sweetmeat and the pie plate, compressing and securely uniting said common sheets of dough horizontally along the interconnecting flanges without compressing the crown of the pie, separating said common sheets of dough without appreciable wastage along the medial lines of the flanges interconnecting the partition walls, removing the waste dough overlying the peripheral wall of the plate to form a plurality of individual sealed sector shaped pies, and baking the pies on the plate.

THEODORE M. MEARS.